United States Patent
Huang et al.

(10) Patent No.: US 10,849,075 B2
(45) Date of Patent: Nov. 24, 2020

(54) METHOD AND DEVICE FOR ALLOCATION OF TRANSMISSION POWER AND TERMINAL

(71) Applicant: CLOUDMINDS (SHENZHEN) ROBOTICS SYSTEMS CO., LTD., Shenzhen (CN)

(72) Inventors: William Xiao-Qing Huang, Guangdong (CN); Haitao Jiang, Guangdong (CN); Zhenkai Wang, Guangdong (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/347,087

(22) PCT Filed: Sep. 1, 2016

(86) PCT No.: PCT/CN2016/097762
§ 371 (c)(1),
(2) Date: May 2, 2019

(87) PCT Pub. No.: WO2018/040047
PCT Pub. Date: Mar. 8, 2018

(65) Prior Publication Data
US 2020/0187124 A1 Jun. 11, 2020

(51) Int. Cl.
*H04L 12/28* (2006.01)
*H04W 52/14* (2009.01)
(Continued)

(52) U.S. Cl.
CPC ......... *H04W 52/14* (2013.01); *H04W 52/367* (2013.01); *H04W 72/0473* (2013.01); *H04W 72/10* (2013.01)

(58) Field of Classification Search
CPC ............. H04W 28/0221; H04W 52/16; H04W 52/146; H04W 72/10
(Continued)

(56) References Cited

U.S. PATENT DOCUMENTS 6,865,393 B1 * 3/2005 Baum ................... H04W 28/00
375/261
2006/0252450 A1 * 11/2006 Wigard ............... H04W 52/146
455/522
(Continued)

FOREIGN PATENT DOCUMENTS

CN 101569113 A 10/2009
CN 102415169 A 4/2012

*Primary Examiner* — John Pezzlo (57) ABSTRACT

The present disclosure discloses a method and a device for allocation of transmission power and a terminal, relating to the field of Internet of vehicles. The method includes: determining communication links having communication requirements at the current moment; acquiring a power request value corresponding to each of the communication links, and adding the power request value corresponding to each of the communication links to obtain an accumulated power value; when it is determined that the accumulated power value is greater than or equal to a preset power limit value, acquiring the service priority of each of the communication links, and allocating transmission power to each of the communication links according to the service priority.

11 Claims, 2 Drawing Sheets

(51) Int. Cl.
  *H04W 52/36* (2009.01)
  *H04W 72/04* (2009.01)
  *H04W 72/10* (2009.01)
  *H04J 1/16* (2006.01)
(58) Field of Classification Search
  USPC .................................... 370/252, 329, 386
  See application file for complete search history.

(56) References Cited

U.S. PATENT DOCUMENTS

2009/0111506 A1* 4/2009 Laroia .................. H04W 52/18
                                                         455/550.1
2016/0174122 A1   6/2016 Sorrentino et al.

* cited by examiner

METHOD AND DEVICE FOR ALLOCATION OF TRANSMISSION POWER AND TERMINAL

CROSS-REFERENCE TO RELATED APPLICATION

This application claims the benefit of PCT application No. PCT/CN2016/097762 filed on Sep. 1, 2016, the contents of which are incorporated herein by reference.

FIELD OF THE INVENTION

The present disclosure relates to the field of Internet of vehicles, and in particular to a method and a device for allocation of transmission power and a terminal.

BACKGROUND OF THE INVENTION

The Internet of vehicles is a huge interactive network composed of information such as vehicle locations, speeds and routes. With the development of technologies of Internet of vehicles, adjacent carriers of a 5.9 GHz frequency band will be used to perform V2V (vehicle-to-vehicle communication) communication, V2X communication (vehicle-to-base station or vehicle-to-infrastructure communication or the like) via their respective communication links.

The communication links above may be driven by the same power amplifier. Due to limitation of the capability of terminal power amplifiers, when multiple communication links perform concurrent operation, the transmission power still maintains a total power limit (such as 23 dBm) the same as that when a single communication link operates. Therefore, in the case where the required transmission power is higher than the total power limit, the transmission power to be allocated is limited, which may result in failure of concurrent operation of the multiple communication links.

SUMMARY OF THE INVENTION

An objective of the present disclosure is to provide a method and a device for allocation of transmission power and a terminal, which are used to allocate transmission power for communication links according to service priorities, so as to solve the existing technical problem that the multiple communication links cannot operate concurrently.

In order to achieve the above object, according to a first aspect of embodiments of the present disclosure, a method for allocation of transmission power is provided, which is applied to the terminal. The method includes: determining communication links having communication requirements at the current moment; acquiring a power request value corresponding to each of the communication links, and adding the power request value corresponding to each of the communication links to obtain an accumulated power value; when it is determined that the accumulated power value is greater than or equal to a preset power limit value, acquiring the service priority of each of the communication links, and allocating transmission power to each of the communication links according to the service priority.

Optionally, the acquiring a power request value corresponding to each of the communication links includes: when a communication peer end receives a first data packet sent by a terminal at the previous moment, receiving feedback information sent by the communication peer end according to the first data packet, wherein the feedback information includes a power adjustment value obtained by the communication peer end according to the first data packet; and the power request value is obtained according to the power adjustment value.

Optionally, the acquiring a power request value corresponding to each of the communication links includes: receiving a second data packet sent by the communication peer end; obtaining a power adjustment parameter according to the second data packet; and obtaining a power adjustment value according to the power adjustment parameter, and obtaining a power request value according to the power adjustment value.

Optionally, the allocating transmission power to each of the communication links according to the service priority includes: suspending data transmission of the communication link with the lowest service priority at the current moment.

Optionally, the suspending data transmission of the communication link with the lowest service priority at the current moment includes: when it is determined that multiple communication links have the lowest service priority, acquiring transmission delay requirement information of the communication links; and suspending data transmission of the communication link with the lowest transmission delay requirement according to the transmission delay requirement information.

Optionally, the allocating transmission power to each of the communication links according to the service priority includes: allocating transmission power to the communication links in sequence according to the sequence of the service priorities.

Optionally, the allocating transmission power to each of the communication links according to the service priority includes: acquiring a preset weight corresponding to the service priority of each of the communication links; and allocating transmission power to each of the communication links according to the preset weight.

Optionally, the allocating transmission power to each of the communication links according to the service priority includes: reducing a transmission bandwidth of the communication link with the lowest service priority to a predetermined bandwidth.

Optionally, the method further includes: when it is determined that the accumulated power value is less than the preset power limit value, setting the power request value to transmission power of the corresponding communication link.

Optionally, before the acquiring the service priority of each of the communication links, the method further includes: determining whether the power request value of the communication link is greater than or equal to the highest transmit power of the communication link; when it is determined that the power request value of the communication link is greater than or equal to the highest transmit power of the communication link, setting the power request value to the highest transmit power.

According to a second aspect of embodiments of the present disclosure, a device for allocation of transmission power is provided, which is applied to the terminal. The device includes: a determining module, configured to determine communication links having communication requirements at the current moment; a processing module, configured to acquire a power request value corresponding to each of the communication links, and add the power request value corresponding to each of the communication links to obtain an accumulated power value; and a power allocation module, configured to, when it is determined that the accumulated power value is greater than or equal to a preset power limit value, acquire the service priority of each of the communication links, and allocate transmission power to each of the communication links according to the service priority.

Optionally, the processing module is configured to, when a communication peer end receives a first data packet sent by a terminal at the previous moment, receive feedback information sent by the communication peer end according to the first data packet, wherein the feedback information includes a power adjustment value obtained by the communication peer end according to the first data packet; and the power request value is obtained according to the power adjustment value.

Optionally, the processing module is configured to receive a second data packet sent by the communication peer end; obtain an adjustment parameter according to the second data packet; and obtain a power adjustment value according to the adjustment parameter, and obtain the power request value according to the power adjustment value.

Optionally, the power allocation module is configured to suspend data transmission of the communication link with the lowest service priority at the current moment.

Optionally, the power allocation module is configured to, when it is determined that multiple communication links have the lowest service priority, acquire transmission delay requirement information of the communication links; and suspend data transmission of the communication link with the lowest transmission delay requirement according to the transmission delay requirement information.

Optionally, the power allocation module is configured to allocate transmission power to the communication links in sequence according to the sequence of the service priorities.

Optionally, the power allocation module is configured to acquire a preset weight corresponding to the service priority of each of the communication links; and allocate transmission power to each of the communication links according to the preset weight.

Optionally, the power allocation module is configured to reduce a transmission bandwidth of the communication link with the lowest service priority to a predetermined bandwidth.

Optionally, the device further includes a first power setting module, configured to, when it is determined that the accumulated power value is less than the preset power limit value, set the power request value to transmission power of the corresponding communication link.

Optionally, the device further includes a judgment module, configured to, before acquiring the service priority of each of the communication links, determine whether the power request value of the communication link is greater than or equal to the highest transmit power limit of the communication link; a second power setting module, configured to, when it is determined that the power request value of the communication link is greater than or equal to the highest transmit power limit of the communication link, set the power request value to the highest transmit power limit.

According to a third aspect of the embodiments of the present disclosure, a non-transitory computer readable storage medium is provided, including one or more programs for performing the method described in the first aspect.

According to a fourth aspect of the embodiments of the present disclosure, the terminal is provided, including: the non-transitory computer readable storage medium described in the third aspect; and one or more processors for executing programs in the non-transitory computer readable storage medium.

The above technical solution is adopted to obtain the service priorities of the communication links having communication requirements at present, and allocate transmission bandwidths to the communication links according to the service priorities, thereby flexibly deploying limited transmission power to ensure data transmission of communication links with high priority in the Internet of vehicles, so as to solve the existing technical problem that multiple communication links cannot operate concurrently.

Other features and advantages of the present disclosure will be described in detail in the following specific embodiments.

BRIEF DESCRIPTIONS OF THE DRAWINGS

The drawings, which are intended to provide a further understanding of the present disclosure and constitute a part of the description, are used to explain the present disclosure together with the following specific embodiments, but do not constitute a limitation to the present disclosure. In which.

DETAILED DESCRIPTION OF THE EMBODIMENTS

The specific embodiments of the present disclosure are described in detail below in conjunction with the accompanying drawings. It should be understood that the specific embodiments described herein are merely illustrative of the present disclosure and are not intended to limit the present disclosure.

First, the application scenarios of the present disclosure are described, the method and device for allocation of transmission power and the terminal provided by the present disclosure can be applied to the Internet of vehicles, which is a huge interactive network composed of information such as vehicle locations, speeds and routes. Vehicles can complete collection of their own environment and state information through GPS (Global Positioning System), RFID (Radio Frequency Identification), sensors, camera image processing and other devices; all vehicles can transmit and converge various their own information to the central processor through Internet technology; the information of these plenty vehicles can be analyzed and processed through the computer technology to calculate optimal routes of different vehicles, thereby reporting road conditions and arranging cycles of signal lamp.

Now, the development track of the Internet of vehicles can be divided into three stages below:

The first stage: in-vehicle information services (route planning, navigation, remote diagnosis, multimedia downloads).

The second stage: assisted driving (speed limit reminding, collision warning; speed guide, road emergency information, driving behavior indicator light).

The third stage: automatic driving and intelligent transportation (collaborative automatic driving and intelligent transportation combining environmental awareness and cloud intelligent control).

Currently, 3GPP (3rd Generation Partnership Project) is conducting LTE-V (Internet of vehicles dedicated communication) standardization research work (mainly for requirements of the second stage), including the research of V2V (vehicle-to-vehicle communication), V2X (vehicle-to-infrastructure communication, vehicle-to-base station communication, vehicle-to-human communication requirement). The future 5G network will have the capability of ultra-large bandwidth transmission, ultra-low delay processing and precise location perception, which will fully support requirements of the third stage of development of the Internet of vehicles.

In the second and third stages, it is a key research direction in the field of the Internet of vehicles to provide assisted driving or automatic driving through cloud intelligent control and processing in the industry at present. In order to achieve cloud intelligent control and processing, a reliable transmission link is needed between a vehicle and a cloud intelligent server, which can be realized by V2X in the LTE-V (Internet of vehicles protocol) technology, including vehicle-to-base station communication and vehicle-to-infrastructure communication.

According to the spectrum allocation of the Internet of vehicles being studied and formulated at present, it is very likely to allocate a dedicated frequency to the Internet of vehicles in the 5.9 GHz frequency band internationally compatible, V2V communication and V2X communication will use adjacent carries of the 5.9 GHz frequency band. When multiple links perform concurrent operation, the three communication links above may be driven by the same power amplifier, and due to limitation of the capability of terminal power amplifiers, the transmission power will still maintain a total power limit (such as 23 dBm) the same as that when a single link operates. V2V and V2I (vehicle-to-base station communication) links perform transmission at the highest transmit power. Therefore, when the required transmission power is higher than the total power limit, the V2X link may fail to operate in the case of V2V link communication; or, the V2V link may fail to operate in the case of V2X link communication, so that concurrent operation of multiple communication links cannot be realized.

In order to achieve concurrent operation of multiple communication links and ensure normal transmission of the data of communication links with high priority, the present disclosure provides the method and device for allocation of transmission power and the terminal, capable of obtaining the service priorities of the communication links having communication requirements at the current moment, and allocating transmission bandwidths to the communication links according to the service priorities, thereby flexibly deploying limited transmission power to ensure data transmission of the communication links with high priority in the Internet of vehicles, so as to solve the existing technical problem that multiple communication links cannot operate concurrently.

The present disclosure will be described in detail in conjunction with the specific embodiments.

Figure 1:
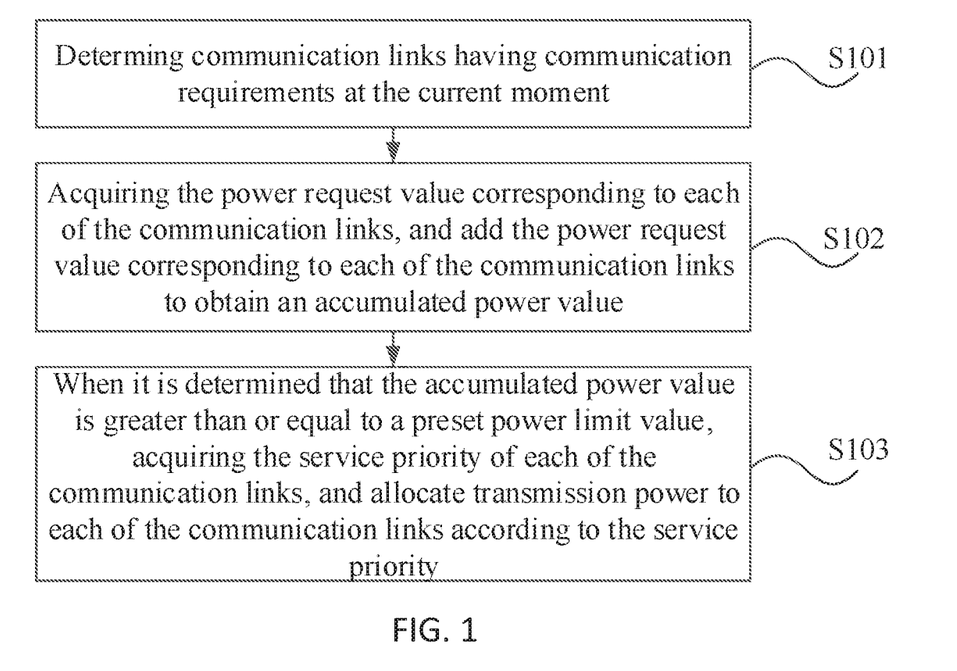
FIG. 1 is a schematic flow chart showing a method for allocation of transmission power according to an embodiment.

FIG. 1 is a method for allocation of transmission power according to embodiments of the present disclosure. As shown in FIG. 1, the method is applied to a terminal which may be disposed on a vehicle in the present embodiment. The method includes:

S101. Determine communication links having communication requirements at the current moment.

Wherein, the communication links having communication requirements at the current moment are communication links having the requirement for transmitting data at the current moment or communication links going to transmit data at the current moment.

In a possible implementation manner of embodiments of the present disclosure, the terminal may receive scheduling information sent by a communication peer end, and determine, according to the scheduling information, whether the communication links at the current moment are communication links with communication requirements.

For example, communication between a vehicle and a base station is controlled by the base station, and the base station sends to the terminal control information including scheduling information for uplink data transmission, and the terminal receives the control information sent by the base station to obtain information such as the current moment, the moment at which the vehicle and the base station perform data transmission, according to the scheduling information, thereby determining that the communication links between the vehicle and the base station are communication links having communication requirements.

S102. Acquire a power request value corresponding to each of the communication links, and add the power request value corresponding to each of the communication links to obtain an accumulated power value.

In this step, after determining communication links having communication requirements at the current moment, the power request value corresponding to each of the communication links can be obtained in any of the following two ways:

The first way: when a communication peer end receives a first data packet sent by a terminal at the previous moment, feedback information sent by the communication peer end according to the first data packet is received, wherein the feedback information includes a power adjustment value obtained by the communication peer end according to the first data packet; and the terminal obtains the power request value according to the power adjustment value.

In present way, after receiving the first data packet, the communication peer end demodulates the first data packet to obtain an adjustment parameter which may be a bit error rate or a block error rate. The terminal determines whether the adjustment parameter is greater than or equal to a first preset value, when it is determined that the obtained adjustment parameter is greater than or equal to a first preset value, it indicates that there's a need to increase the transmission power, and further determine a preset quantization interval corresponding to the difference between the adjustment parameter and the first preset value, acquire the power adjustment value of the corresponding preset quantization interval, and send the power adjustment value to the terminal, and the terminal adds the power adjustment value to the transmission power of the communication link at the previous moment to obtain the power request value.

When the communication peer end determines the obtained adjustment parameter is less than the first preset value, it can be further determined whether the obtained adjustment parameter is less than or equal to a second preset value, when it is determined that the obtained adjustment parameter is less than or equal to a second preset value, it indicates that there's a need to reduce the transmission power, and further determine a preset quantization interval corresponding to the difference between the adjustment parameter and the first preset value, acquire the power adjustment value of the corresponding preset quantization interval, and send the power adjustment value to the terminal, and the terminal adds the power adjustment value to the transmission power of the communication link at the previous moment to obtain the power request value.

For example, the preset quantization interval can be divided into five intervals, of which the corresponding power adjustment values can be preset to −2 dB, −1 dB, 0 dB, 1 dB and 2 dB respectively, wherein −1 dB indicates the transmission power of the communication link at the previous moment is reduced by 1 dB, −2 dB means that the transmission power of the previous moment is reduced by 2 dB, 0 dB indicates that power adjustment is not needed (that is, the power request value of the current moment is the same as the transmission power of the previous moment), 1 dB indicates that the transmission power of the communication link at the previous moment is increased by 1 dB, and 2 dB means that the transmission power of the previous moment is increased by 2 dB. Thus, when the power adjustment value corresponding to the preset quantization space of the difference between the adjustment parameter and the first preset value is 2 dB, the transmission power of the communication link at the previous moment is increased by 2 dB to obtain the power request value of the current moment; when the power adjustment value corresponding to the preset quantization space of the difference between the adjustment parameter and the first preset value is −2 dB, the transmission power of the communication link at the previous moment is reduced by 2 dB to obtain the power request value of the current moment, and so on. The transmission power of the previous moment is adjusted according to the power adjustment value corresponding to the preset quantization space of the difference between the adjustment parameter and the first preset value so as to obtain the power request value of the current moment.

It should be noted that the present disclosure is not limited to first judging whether the adjustment parameter is greater than or equal to the first preset value, and when the adjustment parameter is less than the first preset value, judging whether the adjustment parameter is less than or equal to the second preset; and it is also possible to first judge whether the adjustment parameter is less than or equal to the second preset value, and when the adjustment parameter is greater than the second preset value, judge whether the adjustment parameter is greater than or equal to the first preset value. The specific judgment order in this embodiment is not limited, for example, the two adjustments can be performed at the same time.

The second way: a second data packet sent by the communication peer end is received; an adjustment parameter is obtained according to the second data packet; and a power adjustment value is obtained according to the adjustment parameter, and the power request value is obtained according to the power adjustment value.

Similarly, the adjustment parameter may be a bit error rate or a block error rate. In present manner, the terminal receives the second data packet sent by the communication peer end and demodulates the second data packet to obtain the adjustment parameter, and determines whether the adjustment parameter is greater than or equal to a first preset value, when it is determined that the obtained adjustment parameter is greater than or equal to a first preset value, it indicates that there's a need to increase the transmission power, and further determines a preset quantization interval corresponding to the difference between the adjustment parameter and the first preset value, acquires the power adjustment value of the corresponding preset quantization interval, and adds the power adjustment value to the transmission power of the communication link at the previous moment to obtain the power request value.

When it is determined that the obtained adjustment parameter is less than the first preset value, it can be further determined whether the obtained adjustment parameter is less than or equal to a second preset value, when it is determined that the obtained adjustment parameter is less than or equal to a second preset value, it indicates that there's a need to reduce the transmission power, and further determine a preset quantization interval corresponding to the difference between the adjustment parameter and the first preset value, acquire the power adjustment value of the corresponding preset quantization interval, and adds the power adjustment value to the transmission power of the communication link at the previous moment to obtain the power request value at the current moment.

In the second way, the present disclosure is not limited to first judging whether the adjustment parameter is greater than or equal to the first preset value, and when the adjustment parameter is less than the first preset value, judging whether the adjustment parameter is less than or equal to the second preset; and it is also possible to first judge whether the adjustment parameter is less than or equal to the second preset value, and when the adjustment parameter is greater than the second preset value, judge whether the adjustment parameter is greater than or equal to the first preset value. The specific judgment order in this embodiment is not limited, for example, the two adjustments can be performed at the same time.

It can be seen from the above that the difference between the above two ways lies that the first way is that the communication peer end obtains the adjustment parameter according to the first data packet sent by the terminal at the previous moment, obtains the power adjustment value according to the adjustment parameter, and sends the power adjustment value to the terminal, and the terminal obtains the power request value according to the power adjustment value; while the second way is that the terminal obtains the adjustment parameter according to the second data packet sent by the communication peer end, obtains the power adjustment value according to the adjustment parameter, and then obtain the power request value according to the power adjustment value. Therefore, in the first way, the power adjustment value is obtained by the communication peer end and then sent to the terminal, and the terminal obtains the power request value according to the power adjustment value, and in the second way, the terminal automatically obtains the power request value according to the second data packet in communication with the communication peer end.

It should be noted that when the adjustment parameter is less than the first preset value and greater than the second preset value, it is determined that power adjustment is not needed.

Thus, after the power request value of each of the communication links is obtained, the obtained power request values are added to obtain an accumulated power value.

Since different countries have different management requirements for different communication services, for example, the maximum transmit power for vehicle-to-vehicle communication may be 20 dBm in China and 23 dBm in the United States, and even if there is a power headroom, it cannot exceed the management requirements of these areas, which results in that even if the power request value of the communication link exceeds the maximum transmission power, data transmission is still performed according to the maximum transmission power, thereby failing to satisfy the transmission requirement of the communication link. In order to solve the above problem, in another embodiment of the present disclosure, before performing step S103, it may be further determined whether the power request value of the communication link is greater than or equal to the highest transmit power of the communication link, when it is determined that the power request value of the communication link is greater than or equal to the highest transmit power of the communication link, the power request value is set to the highest transmit power, and after that, the subsequent step S103 is performed, so that different maximum transmit power can be configured in different communication links according to different terminal types and network coverage conditions, for example, in a expressway scenario, if the coverage of a base station is very good (the vehicle-to-base station communication is not sensitive to the power requirement), more power can be configured for vehicle-to-vehicle communication. On the contrary, if the coverage of a basic network is very poor, when the requirement for vehicle-to-vehicle communication on a non-blocked road may not be a rigid requirement, the maximum transmit power of the vehicle-to-base station communication can be set higher, which means that more power is configured for the vehicle-to-base station communication, so as to meet the requirements of different communication links for transmit power sensitivity under different network coverage scenarios.

In addition, when it is determined that the power request value of the communication link is less than the highest transmit power of the communication link, step S103 is directly performed.

S103. When it is determined that the accumulated power value is greater than or equal to the preset power limit value, acquire the service priority of each of the communication links, and allocate transmission power to each of the communication links according to the service priority.

Wherein, when it is determined that the accumulated power value is less than the preset power limit value, it is determined that the current transmission power to be allocated by the terminal can meet transmission of all communication links, so that the power request value can be set to transmission power of the corresponding communication link.

In this step, the service priority is correspondingly set for each of the communication links. Specifically, corresponding service priority identifiers can be preset to represent the sequence of the service priorities to reflect the importance of the services corresponding to the communication links. For example, the service priorities can be configured as follows: the priority of vehicle-to-vehicle communication security related services is higher than that of vehicle-to-cloud robot interactive safety driving related services, the priority of the vehicle-to-cloud robot interactive safety driving related services is higher than that of vehicle-to-communication infrastructure management related communication services, the priority of the vehicle-to-communication infrastructure management related communication services is higher than that of vehicle-to-cloud robot traffic auxiliary services, in which the vehicle-to-vehicle communication security related services may include security reminding, automatic driving conduction information, high-speed sensor information interaction information, etc.; the vehicle-to-cloud robot interactive safety driving related services may include cloud aided driving, cloud vehicle guidance, cloud traffic signal reminding, cloud road condition reminding, etc.; the vehicle-to-communication infrastructure management related communication services may include payment information, traffic signal reminding, traffic information collection, road condition reminding, etc.; and the vehicle-to-cloud robot traffic auxiliary services may include real-time three-dimensional map download push, in-vehicle entertainment communication, vehicle remote monitoring, vehicle on-line navigation, etc.

In this embodiment, different priorities may be set according to specific services, for example, the service priority identifier set for the vehicle-to-vehicle communication security related services is 1, the service priority identifier set for the vehicle-to-cloud robot interactive safety driving related services is 2, the service priority identifier set for the vehicle-to-communication infrastructure management related communication services is 3, the service priority identifier of the vehicle-to-cloud robot traffic auxiliary services is 4, and the service priority identifiers from 1 to 4 sequentially indicate the service priorities from high to low.

It should be noted that the foregoing exemplary description of the service priority identifiers is merely illustrative, and the present disclosure is not limited thereto.

Thus, the terminal can obtain the service priority of the communication link by using the service priority identifier corresponding to the communication link.

In this step, after the service priority of the communication link is obtained, transmission power is allocated to each of the communication links in any of the following four ways:

The first way: suspend data transmission of the communication link with the lowest service priority at the current moment.

Thus, by suspending data transmission of the communication link with the lowest service priority at the current moment, transmission power for the communication links with high priority is preferentially ensured to guarantee data transmission of services with high priority.

In addition, it is possible that multiple communication links have the lowest service priority, so that in another embodiment of the present disclosure, when it is determined that multiple communication links have the lowest service priority, transmission delay requirement information of the communication links is acquired; and data transmission of the communication link with the lowest transmission delay requirement is suspended according to the transmission delay requirement information.

In present way, data to be transmitted on the communication links have information such as QoS (Quality of Service) identifiers or service type identifiers, and the information includes transmission delay requirement information, that is, the maximum allowable transmission delay value of the service or identification information reflecting the value.

A smaller maximum allowable transmission delay value of the service indicates a higher transmission delay requirement of the service, and such transmission needs to be guaranteed preferentially. Therefore, in this embodiment, data transmission of the communication link of which the maximum allowable transmission delay value of the transmission service is the minimum is preferentially guaranteed, and data transmission of the communication link of which the maximum allowable transmission delay value of the service is the maximum is suspended.

After the data transmission of the communication links with the lowest service priority is suspended, in another embodiment of the present disclosure, it may continue to determine whether the accumulated power value of the communication link is greater than or equal to the preset power limit value at the next moment, if the accumulated power value of the communication link is still greater than or equal to the preset power limit value, the data transmission of the communication links with the lowest service priority is continued, and if the accumulated power value is less than the preset power limit value, the data transmission of the communication links with the lowest service priority is restored.

The second way: allocate transmission power to the communication links in sequence according to the sequence of the service priorities.

In present way, the power request value of the communication link with the highest service priority may be preferentially met according to the sequence of the service priorities, and then the power request value of the communication link of the second highest priority is met, and so on, until allocation of all the transmission power to be allocated is completed.

For example, the services corresponding to the four communication links currently having communication requirements are respectively vehicle-to-vehicle communication security related services, vehicle-to-cloud robot interactive safety driving related services, vehicle-to-communication infrastructure management related communication services, and vehicle-to-cloud robot traffic auxiliary services, wherein the service priority identifier set for the vehicle-to-vehicle communication security related services is 1, the service priority identifier set for the vehicle-to-cloud robot interactive safety driving related services is 2, the service priority identifier set for the vehicle-to-communication infrastructure management related communication services is 3, and the service priority identifier of the vehicle-to-cloud robot traffic auxiliary services is 4, and the service priority identifiers from 1 to 4 sequentially indicate the service priorities from high to low. When the allocation of the transmission power is performed, the transmission power to be allocated (the same as the preset power limit value) is preferentially used to allocate transmission power to the communication link of the vehicle-to-vehicle communication security-related services to meet the power request value of the communication link. In this case, the remaining transmission power to be allocated is the power after the transmission power allocated for the communication link of the vehicle-to-vehicle communication security related service is removed from the preset power limit value, and then the remaining power to be allocated is used to allocate transmission power to the communication link of the vehicle-to-cloud robot interactive safety driving related services to meet power request value of the communication link, and so on, until allocation of all the transmission power to be allocated is completed.

In addition, if allocation of the transmission power to be allocated is completed, it is possible that no transmission power is allocated to communication links with low priority, then the communication links with low priority to which no transmission power is allocated cannot perform data transmission, so as to preferentially ensure data transmission with high priority.

The third way: acquire a preset weight corresponding to the service priority of each of the communication links, and allocate transmission power to each of the communication links according to the preset weight.

In this way, corresponding weights can be preset for communication links of different services according to the service priorities of the communication links, so as to perform allocation according to the preset weights when transmission power is allocated.

For example, the service priority of the communication link corresponding to the weight 1 is the highest, the service priority of the communication link corresponding to the weight 2 is the second, the service priority of the communication link corresponding to the weight 3 is the third, and if the preset weight of the communication link corresponding to the weight 1 is 70%, it indicates the terminal allocates 70% of the transmission power to be allocated to the communication link corresponding to the weight 1. In this case, the terminal can use 70% (equivalent to the preset weight) of the transmission power to be allocated to guarantee data transmission of the communication link corresponding to the weight 1. If 70% of the transmission power to be allocated is greater than or equal to the power request value of the communication link corresponding to the weight 1, data is transmitted with the power request value; and if 70% of the transmission power to be allocated is less than the power request value of the communication link corresponding to the weight 1, the transmission of the communication link corresponding to the weight 1 is performed with 70% of the transmission power to be allocated.

If the preset weight of the communication link corresponding to the weight 2 is 70%, it indicates that the terminal allocates 70% of the remaining power after the transmission power of the communication link with the weight 1 is removed from the transmission power to be allocated to the communication link corresponding to the weight 2; when 70% of the transmission power to be allocated is greater than or equal to the power request value of the communication link corresponding to the weight 1, 70% of the remaining power after the transmission power of the communication link with the weight 1 is removed is used to guarantee data transmission of the communication link corresponding to the weight 2, if 70% of the remaining power is greater than or equal to the power request value of the communication link corresponding to the weight 2, transmission is performed with the power request value of the communication link corresponding to the weight 2, otherwise, transmission of the communication link corresponding to the weight 2 is performed with 70% of the remaining power, and so on, until allocation of the transmission power is completed according to the preset weight.

It should be noted that the foregoing related description of the preset weight is merely illustrative, and the present disclosure is not limited thereto.

The fourth way: reduce a transmission bandwidth of the communication link with the lowest service priority to a predetermined bandwidth.

Wherein the predetermined bandwidth can be a bandwidth of which the power spectral density satisfies the coverage requirement.

In present way, it is considered that the transmission bandwidth can be reduced only through complicated interaction information required for the vehicle-to-base station communication, and the reduction of the transmission bandwidth may also affect the performance of other users, therefore, in another embodiment of the present disclosure, after the service priority of the communication link is known, it can be further determined whether the communication link with the lowest service priority is a V2V (vehicle-to-vehicle communication) link or a V2I (vehicle-to-infrastructure communication) link, and after it is determined that the communication link with the lowest service priority is the V2V link or the V2I link, the transmission bandwidth of the communication link is reduced.

Certainly, when multiple communication links have the lowest service priority, the communication link of which the transmission bandwidth needs to be reduced can be determined by using the transmission delay requirement information. In this embodiment, the transmission bandwidth of the communication link of which the maximum allowable transmission delay value of the service is the maximum can be reduced. We can refer to the description of the transmission delay requirement information in the first way for details, which are not described herein.

It should be noted that, when the communication link with the lowest service priority is determined to be a V2V link or a V2I link, allocation of the transmission power can still be performed according to any one of the foregoing first to third ways.

The above method is adopted to obtain the service priorities of the communication links having communication requirements at present, and allocate transmission bandwidths to the communication links according to the service priorities, thereby flexibly deploying limited transmission power to ensure data transmission of communication links with high priority in the Internet of vehicles, so as to solve the existing technical problem that multiple communication links cannot operate concurrently.

Figure 2:
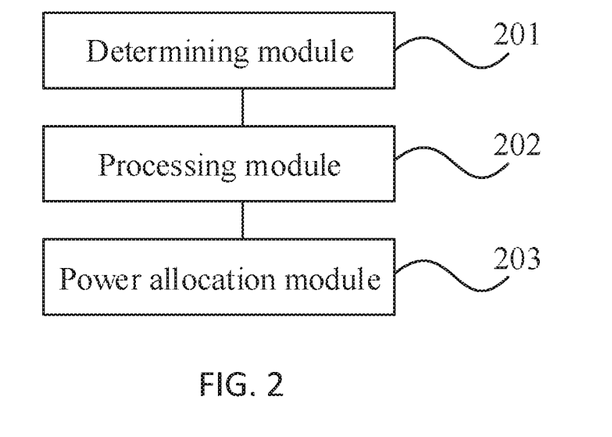
FIG. 2 is a structural schematic view showing a device for allocation of transmission power according to an embodiment.

FIG. 2 is a device for allocation of transmission power provided by embodiments of the present disclosure. As shown in FIG. 2, the device is applied to a terminal, and includes:

a determining module 201, configured to determine communication links having communication requirements at the current moment;

a processing module 202, configured to acquire a power request value corresponding to each of the communication links, and add the power request value corresponding to each of the communication links to obtain an accumulated power value;

a power allocation module 203, configured to, when it is determined that the accumulated power value is greater than or equal to the preset power limit value, acquire the service priority of each of the communication links, and allocate transmission power to each of the communication links according to the service priority.

Optionally, the processing module 202 is configured to, when a communication peer end receives the first data packet sent by the terminal at the previous moment, receive feedback information sent by the communication peer end according to the first data packet, wherein the feedback information includes a power adjustment value obtained by the communication peer end according to the first data packet; and the power request value is obtained according to the power adjustment value.

Optionally, the processing module 202 is configured to receive a second data packet sent by the communication peer end; obtain an adjustment parameter according to the second data packet; and obtain a power adjustment value according to the adjustment parameter, and obtain a power request value according to the power adjustment value.

Optionally, the power allocation module 203 is configured to suspend data transmission of the communication link with the lowest service priority at the current moment.

Optionally, the power allocation module 203 is configured to, when it is determined that multiple communication links have the lowest service priority, acquire transmission delay requirement information of the communication links; and suspend data transmission of the communication link with the lowest transmission delay requirement according to the transmission delay requirement information.

Optionally, the power allocation module 203 is configured to allocate transmission power to the communication links in sequence according to the sequence of the service priorities.

Optionally, the power allocation module 203 is configured to acquire a preset weight corresponding to the service priority of each of the communication links; and allocate transmission power to each of the communication links according to the preset weight.

Optionally, the power allocation module 203 is configured to reduce a transmission bandwidth of the communication link with the lowest service priority to a predetermined bandwidth.

Figure 3:
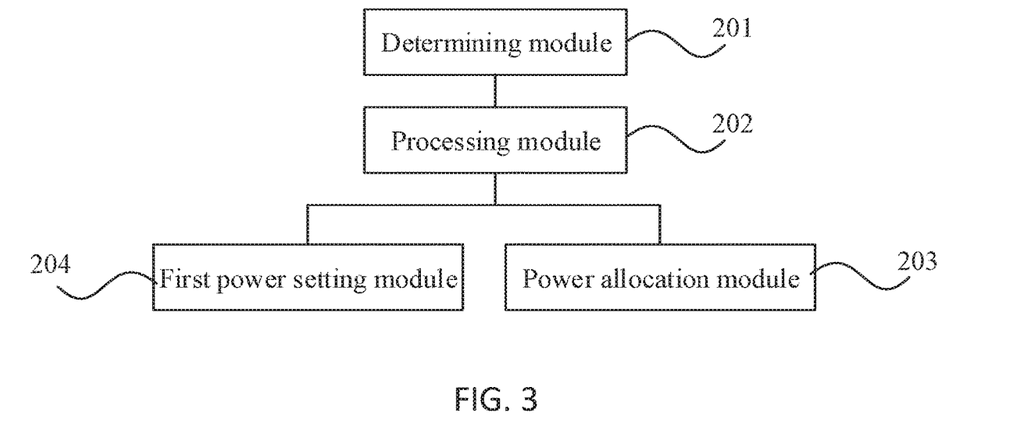
FIG. 3 is a structural schematic view showing another device for allocation of transmission power according to an embodiment.

Optionally, as shown in FIG. 3, the device further includes:

a first power setting module 204, configured to, when it is determined that the accumulated power value is less than the preset power limit value, set the power request value to transmission power of the corresponding communication link.

Figure 4:
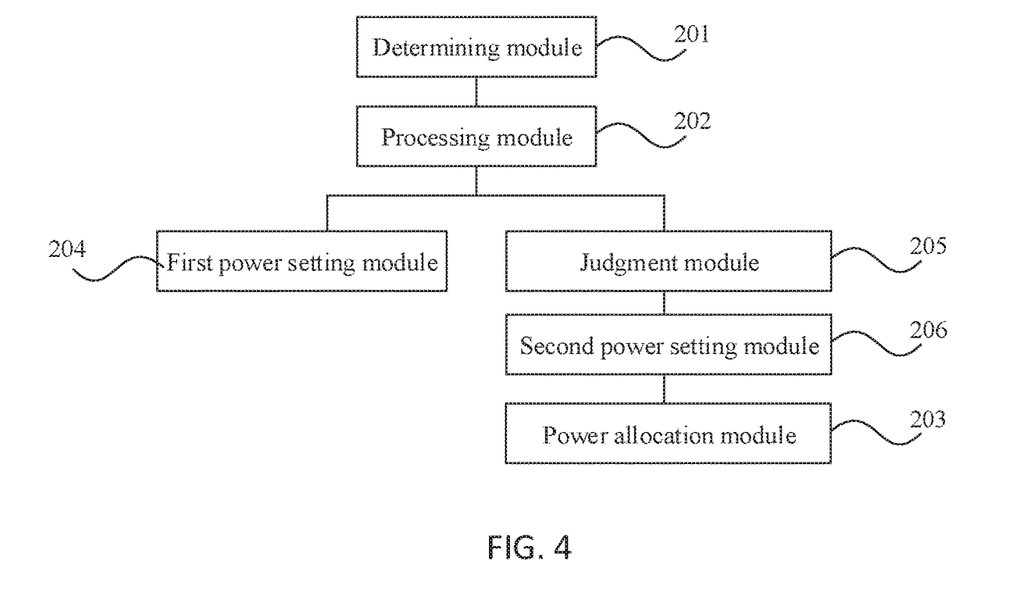
FIG. 4 is a structural schematic view showing still another device for allocation of transmission power according to an embodiment.

Optionally, as shown in FIG. 4, the device further includes:

a judgment module 205, configured to, before the acquiring the service priority of each of the communication links, determine whether the power request value of the communication link is greater than or equal to the highest transmit power limit of the communication link;

a second power setting module 206, configured to, when it is determined that the power request value of the communication link is greater than or equal to the highest transmit power limit of the communication link, set the power request value to the highest transmit power limit.

It should be noted that the person skilled in the art can clearly understand that for the sake of convenient and brief description, the specific operating process and description of the foregoing device for allocation of transmission power can make reference to the corresponding process in the foregoing method embodiment, which will not be repeated herein.

The above device is adopted to obtain the service priorities of the communication links having communication requirements at present, and allocate transmission bandwidths to the communication links according to the service priorities, thereby flexibly deploying limited transmission power to ensure data transmission of communication links with high priority in the Internet of vehicles, so as to solve the existing technical problem that multiple communication links cannot operate concurrently.

The embodiment of the present disclosure further provides a non-transitory computer readable storage medium 1, which includes one or more programs for executing a method for allocation of transmission power. The method is applied to a terminal, and the method includes: determining communication links having communication requirements at the current moment; acquiring a power request value corresponding to each of the communication links, and adding the power request value corresponding to each of the communication links to obtain an accumulated power value; when it is determined that the accumulated power value is greater than or equal to a preset power limit value, acquiring the service priority of each of the communication links, and allocating transmission power to each of the communication links according to the service priority.

Optionally, the acquiring a power request value corresponding to each of the communication links includes: when a communication peer end receives a first data packet sent by the terminal at the previous moment, receiving feedback information sent by the communication peer end according to the first data packet, wherein the feedback information includes a power adjustment value obtained by the communication peer end according to the first data packet; and the power request value is obtained according to the power adjustment value.

Optionally, the acquiring a power request value corresponding to each of the communication links includes: receiving a second data packet sent by the communication peer end; obtaining an adjustment parameter according to the second data packet; and obtaining a power adjustment value according to the adjustment parameter, and obtaining a power request value according to the power adjustment value.

Optionally, the allocating transmission power to each of the communication links according to the service priority includes: suspending data transmission of the communication link with the lowest service priority at the current moment.

Optionally, the suspending data transmission of the communication link with the lowest service priority at the current moment includes: when it is determined that multiple communication links have the lowest service priority, acquiring transmission delay requirement information of the communication links; and suspending data transmission of the communication link with the lowest transmission delay requirement according to the transmission delay requirement information.

Optionally, the allocating transmission power to each of the communication links according to the service priority includes: allocating transmission power to the communication links in sequence according to the sequence of the service priorities.

Optionally, the allocating transmission power to each of the communication links according to the service priority includes: acquiring a preset weight corresponding to the service priority of each of the communication links; and allocating transmission power to each of the communication links according to the preset weight.

Optionally, the allocating transmission power to each of the communication links according to the service priority includes: reducing a transmission bandwidth of the communication link with the lowest service priority to a predetermined bandwidth.

Optionally, when it is determined that the accumulated power value is less than the preset power limit value, the power request value is set to transmission power of the corresponding communication link.

Optionally, before the acquiring the service priority of each of the communication links, determine whether the power request value of the communication link is greater than or equal to the highest transmit power of the communication link; when it is determined that the power request value of the communication link is greater than or equal to the highest transmit power of the communication link, the power request value is set to the highest transmit power.

The embodiment of the present disclosure further provides a terminal 2, including:
the non-transitory computer readable storage medium 1; and
one or more processors for executing programs in the non-transitory computer readable storage medium 1.

The preferred embodiments of the present disclosure are described in detail above in conjunction with the accompanying drawings, but the present disclosure is not limited to the specific details in the above embodiments. Various simple variations that may be made to the technical solutions of the present disclosure within the scope of the technical concept of the present disclosure are all within the protection scope of the present disclosure.

In addition, it should be noted that the respective specific technical features described in the above specific embodiments may be combined in any suitable way without contradiction. In order to avoid unnecessary duplication, various possible combination ways will not be illustrated otherwise in the present disclosure.

Furthermore, various different embodiments of the present disclosure may be combined randomly, and should be similarly considered as the disclosure of the present disclosure without breaching the idea of the present disclosure.

The invention claimed is:

1. A method for allocation of transmission power, wherein the method is applied to a terminal, and comprises:
   determining communication links having communication requirements at the current moment;
   acquiring a power request value corresponding to each of the communication links, and adding the power request value corresponding to each of the communication links to obtain an accumulated power value;
   when it is determined that the accumulated power value is greater than or equal to the preset power limit value, acquiring the service priority of each of the communication links, and allocating transmission power to each of the communication links according to the service priority,
   wherein the acquiring the power request value corresponding to each of the communication links comprises:
   when a communication peer end receives a first data packet sent by the terminal at the previous moment, receiving feedback information sent by the communication peer end according to the first data packet, wherein the feedback information comprises a power adjustment value obtained by the communication peer end according to the first data packet;
   obtaining the power request value according to the power adjustment value.

2. The method according to claim 1, wherein the acquiring a power request value corresponding to each of the communication links comprises:
   receiving a second data packet sent by a communication peer end;
   obtaining an adjustment parameter according to the second data packet;
   obtaining a power adjustment value according to the adjustment parameter, and obtaining the power request value according to the power adjustment value.

3. The method according to claim 1, wherein the allocating transmission power to each of the communication links according to the service priority comprises: suspending data transmission of the communication link with the lowest service priority at the current moment.

4. The method according to claim 3, wherein the suspending data transmission of the communication link with the lowest service priority at the current moment comprises:
   when it is determined that multiple communication links have the lowest service priority, acquiring transmission delay requirement information of the communication links;
   suspending data transmission of the communication link with the lowest transmission delay requirement according to the transmission delay requirement information.

5. The method according to claim 1, wherein the allocating transmission power to each of the communication links according to the service priority comprises: allocating transmission power to the communication links in sequence according to the sequence of the service priorities.

6. The method according to claim 1, wherein the allocating transmission power to each of the communication links according to the service priority comprises: acquiring a preset weight corresponding to the service priority of each of the communication links;
allocating transmission power to each of the communication links according to the preset weight.

7. The method according to claim 1, wherein the allocating transmission power to each of the communication links according to the service priority comprises: reducing a transmission bandwidth of the communication link with the lowest service priority to a predetermined bandwidth.

8. The method according to claim 1, wherein the method further comprises: when it is determined that the accumulated power value is less than the preset power limit value, setting the power request value to transmission power of the corresponding communication link.

9. The method according to claim 1, wherein before the service priority of each of the communication links comprises:
determining whether the power request value of the communication link is greater than or equal to the highest transmit power of the communication link;
when it is determined that the power request value of the communication link is greater than or equal to the highest transmit power of the communication link, setting the power request value to the highest transmit power.

10. A non-transitory computer readable storage medium, including one or more programs for performing a method for allocation of transmission power, wherein the method is applied to a terminal, and comprises:
determining communication links having communication requirements at the current moment;
acquiring a power request value corresponding to each of the communication links, and adding the power request value corresponding to each of the communication links to obtain an accumulated power value;
when it is determined that the accumulated power value is greater than or equal to the preset power limit value, acquiring the service priority of each of the communication links, and allocating transmission power to each of the communication links according to the service priority;
wherein the acquiring the power request value corresponding to each of the communication links comprises:
when a communication peer end receives a first data packet sent by the terminal at the previous moment, receiving feedback information sent by the communication peer end according to the first data packet, wherein the feedback information comprises a power adjustment value obtained by the communication peer end according to the first data packet;
obtaining the power request value according to the power adjustment value.

11. A terminal, comprising:
a storage storing computer program; and
one or more processor configured to execute the program in the storage perform a method for allocation of transmission power, wherein the method is applied to a terminal, and comprises:
determining communication links having communication requirements at the current moment;
acquiring a power request value corresponding to each of the communication links, and adding the power request value corresponding to each of the communication links to obtain an accumulated power value;
when it is determined that the accumulated power value is greater than or equal to the preset power limit value, acquiring the service priority of each of the communication links, and allocating transmission power to each of the communication links according to the service priority;
wherein the acquiring the power request value corresponding to each of the communication links comprises:
when a communication peer end receives a first data packet sent by the terminal at the previous moment, receiving feedback information sent by the communication peer end according to the first data packet, wherein the feedback information comprises a power adjustment value obtained by the communication peer end according to the first data packet;
obtaining the power request value according to the power adjustment value.

* * * * *